United States Patent
Marx (10) Patent No.: US 9,616,869 B2
(45) Date of Patent: Apr. 11, 2017

(54) HYDRAULIC BRAKING SYSTEM HAVING A TEMPORARY STORE

(71) Applicant: Lucas Automotive GmbH, Koblenz (DE)

(72) Inventor: Andreas Marx, Hartenfels (DE)

(73) Assignee: Lucas Automotive GmbH, Koblenz (DE)

( * ) Notice: Subject to any disclaimer, the term of this patent is extended or adjusted under 35 U.S.C. 154(b) by 0 days.

(21) Appl. No.: 14/653,490

(22) PCT Filed: Dec. 16, 2013

(86) PCT No.: PCT/EP2013/076684
§ 371 (c)(1),
(2) Date: Jun. 18, 2015

(87) PCT Pub. No.: WO2014/095709
PCT Pub. Date: Jun. 26, 2014

(65) Prior Publication Data
US 2015/0336552 A1    Nov. 26, 2015

(30) Foreign Application Priority Data

Dec. 19, 2012   (DE) .......................... 10 2012 024 950

(51) Int. Cl.
*B60T 13/16* (2006.01)
*B60T 13/68* (2006.01)
(Continued)

(52) U.S. Cl.
CPC .......... *B60T 13/686* (2013.01); *B60T 8/4872* (2013.01); *B60T 13/142* (2013.01)

(58) Field of Classification Search
CPC ..... B60T 8/4872; B60T 13/142; B60T 13/686
(Continued)

(56) References Cited

U.S. PATENT DOCUMENTS 3,718,377 A * 2/1973 Harned ................... B60T 8/32
                                                    188/181 A
5,251,971 A * 10/1993 Reinartz ................ B60T 8/341
                                                    303/115.4
(Continued)

FOREIGN PATENT DOCUMENTS

DE          19529895 A1   2/1996
DE      102004044599 A1   4/2005
(Continued)

*Primary Examiner* — Melody Burch
(74) *Attorney, Agent, or Firm* — MacMillan, Sobanski & Todd, LLC (57) ABSTRACT

The invention relates to a hydraulic braking system for a land vehicle, having at least one wheel brake; a master brake cylinder, which is designed to displace hydraulic fluid into the at least one wheel brake upon actuation of the braking system by the driver; a pump, which is designed to displace hydraulic fluid into the at least one wheel brake; a plurality of valve arrangements; a control unit, which is designed to actuate the pump and the plurality of valve arrangements; and a temporary store, which is connected hydraulically to the at least one wheel brake and to an input of the pump. The temporary store comprises a restoring element and is designed to accommodate a hydraulic fluid reserve volume during a rest state of the braking system, and to make the accommodated hydraulic fluid reserve volume available to the pump for displacement into the at least one wheel brake during an actuation state.

10 Claims, 3 Drawing Sheets

(51) Int. Cl.
*B60T 13/14* (2006.01)
*B60T 8/48* (2006.01)
*B60T 13/74* (2006.01)

(58) Field of Classification Search
USPC .......................................... 303/10, DIG. 11
See application file for complete search history.

(56) References Cited

U.S. PATENT DOCUMENTS

| | | | |
|---|---|---|---|
| 5,700,070 | A | 12/1997 | Sakai |
| 6,364,436 | B1* | 4/2002 | Sawada ................ B60T 7/042 188/353 |
| 9,016,804 | B2 | 4/2015 | Linhoff |
| 2002/0060495 | A1* | 5/2002 | Mizutani ............... B60T 8/4809 303/114.3 |
| 2008/0236959 | A1* | 10/2008 | Hashida ............... B60T 8/4077 188/72.2 |
| 2010/0313560 | A1* | 12/2010 | Koyama ................ B60T 8/368 60/585 |
| 2013/0211685 | A1 | 8/2013 | Ullrich et al. |
| 2014/0361607 | A1 | 12/2014 | Marx |

FOREIGN PATENT DOCUMENTS

| | | |
|---|---|---|
| DE | 102009040169 A1 | 3/2011 |
| DE | 102011017595 A1 | 10/2011 |
| DE | 102011121748 A1 | 6/2013 |
| DE | 102012023345 A1 | 6/2014 |
| EP | 0668199 A1 | 8/1995 |
| EP | 1795412 A2 | 6/2007 |
| GB | 2296056 A | 6/1996 |
| WO | 2012028700 A1 | 3/2012 |

* cited by examiner

HYDRAULIC BRAKING SYSTEM HAVING A TEMPORARY STORE

CROSS-REFERENCE TO RELATED APPLICATIONS

This application is a national stage of International Application No. PCT/EP2013/076684 filed Dec. 16, 2013, which claims priority to German Patent Application No. 10 2012 024 950.0 filed Dec. 19, 2012, the disclosures of which are incorporated herein by reference in their entirety.

BACKGROUND OF THE INVENTION

This document describes a vehicle brake system for a land vehicle, wherein the vehicle brake system comprises an accumulator for accommodating hydraulic fluid. The accumulator accommodates a hydraulic fluid reserve volume in a non-actuated initial state of the vehicle brake system.

Vehicles typically have vehicle braking equipment in which, for braking, a hydraulic fluid is guided into the wheel brakes of the vehicle. However, vehicles increasingly also have an electrical machine which serves to drive the vehicle, in a manner at least assisting an internal combustion engine. The electrical machine has the advantage over an internal combustion engine that it can be operated in the manner of a generator. During operation of the electrical machine in the manner of a generator, the kinetic energy of the vehicle is converted into electrical energy. In this context, the recovery of energy from the kinetic energy of the land vehicle by means of the electrical machine can be called regeneration.

Whereas, in normal brake operation, kinetic energy of the vehicle is converted into thermal energy because of the frictional interaction between the brake blocks and brake discs on the wheel brakes, in the case of regeneration the kinetic energy of the vehicle is used to charge up the vehicle battery. The chemical energy that is stored in the charged battery is then used again during motive operation of the electrical machine, to drive the land vehicle. The vehicle is braked by means of the electrical machine, with the result that the wheel brakes can remain unactuated. Typically, this is indeed desirable, since any kinetic energy converted into thermal energy at the wheel brakes is no longer available for charging up the vehicle battery.

By comparison with a purely hydraulic braking procedure, however, building up the generative braking moment frequently takes somewhat longer. The braking action of the electrical machine that is operated in the manner of a generator also falls off at low speeds. For this reason, typically the electrical machine cannot brake the vehicle to a standstill and/or keep the vehicle reliably at a standstill.

For this reason, there is a concern that, during regeneration too, a hydraulic braking moment should first be built up and then the hydraulic braking moment should be replaced by a generative braking moment. Further, there are concerns that when speed falls below a minimum value, that is to say at the end of regeneration, hydraulic braking moment should be built up. So that the usual brake feel can continue to be imparted to the driver—that is to say so that there are no unexpected pedal reactions and there is no need for the driver to actuate the brake pedal again in the end phase of regeneration—hitherto there has been a need for a plurality of valve switching procedures and for a hydraulic pump to be driven. Because of the noises that occur during this, the driver may perceive the switching procedures in particular of the valve arrangements as disruptive.

For this reason, it would be desirable for as little noise as possible to be created when this function is implemented. Further, it would be desirable for the vehicle brake system to be suitable for purely hydraulically braked vehicles and for generatively braked vehicles, or at least to be capable of being adapted to the respective requirements relatively simply.

BRIEF SUMMARY OF THE INVENTION

This invention provides a vehicle brake system which is of simple construction and is inexpensive to manufacture and which makes possible hydraulic and generative braking procedures. Moreover, the brake system should impart an appropriate brake behaviour and brake feel to the driver, wherein as little noise as possible should be caused by the brake system.

To achieve the object, a hydraulic brake system for a land vehicle is proposed. The hydraulic brake system comprises at least one wheel brake, which is assigned to a wheel of the land vehicle; a master cylinder, which is hydraulically connected to the at least one wheel brake, wherein the master cylinder is adapted to displace hydraulic fluid into the at least one wheel brake when the brake system is actuated by the driver; a pump, the output of which is hydraulically connected to the at least one wheel brake, and the pump is adapted to displace hydraulic fluid into the at least one wheel brake; a plurality of valve arrangements; a control unit, which is adapted to drive the pump and the plurality of valve arrangements; and an accumulator. The accumulator is hydraulically connected to the at least one wheel brake and to an input of the pump, includes a return element and is adapted to accommodate a hydraulic fluid reserve volume during a non-operating state of the brake system, and provide the accommodated hydraulic fluid reserve volume to the pump for displacing it to the at least one wheel brake during an operating state of the brake system.

According to a further aspect, for achieving the object a hydraulic unit is proposed. The pump defined above, the valve arrangements and the accumulator are assigned to this hydraulic unit.

In the case of the proposed solution, the hydraulic fluid reserve volume is already located in the accumulator during the non-operating state, that is to say a state in which the brake system is not actuated. For this reason, in the end phase of regeneration or after regeneration—that is to say in a deceleration procedure during which an electrical machine converts kinetic energy of the land vehicle into electrical energy—some of the hydraulic fluid reserve volume can be displaced from the accumulator to the at least one wheel brakes. The hydraulic fluid volume that is displaced from the accumulator to the at least one wheel brake may be of a dimension such that a minimum brake pressure can be built up in the at least one wheel brake. The minimum brake pressure may in turn be of a dimension such that the vehicle can be braked to a standstill and/or kept reliably at a standstill. Even if the volume of hydraulic fluid that is displaced during the operating state to the wheel brakes and from there to the accumulator would be insufficient to brake the vehicle and/or to keep it at a standstill, the pump can convey a sufficient volume of hydraulic fluid to the wheel brakes. As a result, the hydraulic braking moment that is built up in the end phase of regeneration can be decoupled from the hydraulic fluid volume that is displaced during regeneration to the wheel brakes and/or from the wheel brakes to the accumulator. Since the hydraulic fluid reserve volume is provided in the accumulator, the hydraulic braking moment can be built up more quickly than if the pump were to draw hydraulic fluid from the master cylinder or the brake fluid container. Moreover, for building up the hydraulic braking moment, it is not necessary to open a supply valve of the brake system in order to be able to reduce the creation of noise.

The control unit may be adapted to predetermine switching states for the plurality of valve arrangements during a first phase of the actuating state, wherein the predetermined switching states of the valve arrangements have the effect that a first hydraulic fluid volume is displaced from the at least one wheel brake to the accumulator. The first hydraulic fluid volume may corresponding to a hydraulic fluid volume that has been displaced by the driver, by actuation of the brake pedal, from the master cylinder to the wheel brakes. The first hydraulic fluid volume may be displaced to the accumulator from the wheel brakes in order to switch off a hydraulic braking moment—for example during regeneration. The first phase of the actuating state may for example be the starting phase of regeneration.

The control unit may be adapted to predetermine switching states for the plurality of valve arrangements and a drive signal for the pump during a second phase of the actuating state, wherein the drive signal and the switching states have the effect of displacing a second hydraulic fluid volume from the accumulator to the at least one wheel brake. The second hydraulic fluid volume may comprise at least part of the hydraulic fluid reserve volume. The second phase of the actuating state may for example be the end phase of regeneration. The total of the first hydraulic fluid volume and the second hydraulic fluid volume may correspond to a hydraulic fluid volume that is needed to build up a minimum brake pressure in the at least one wheel brake. The first hydraulic fluid volume may in this case also be zero.

The second hydraulic fluid volume may be greater than the first hydraulic fluid volume.

For this purpose, the control unit may be adapted to drive a first valve arrangement, arranged between the at least one wheel brake and the master cylinder, during the actuating state such that the first valve arrangement throttles a volume displacement from the master cylinder to the at least one wheel brake. The control unit may for example partly drive the first valve arrangement. The first valve arrangement may be an isolation valve of the brake system. The control unit may predetermine the throttling action of the valve arrangement such that a pedal reaction which approximates to a pedal reaction in the case of a purely hydraulic braking procedure is provided to the driver by way of the brake pedal.

The return element may comprise a piston, which delimits the accumulator, and a first spring acting on the piston. The first spring may be secured to the piston and to a wall of the accumulator. The first spring, which is secured to the piston and the wall of the accumulator, may exert a return force on the piston that acts in two different directions. The two different directions may be substantially opposed to one another.

The return element may further comprise a second spring. The first and the second spring may be arranged such that the first spring brings about a return force in a first direction and the second spring brings about a return force in a second direction. The first and second directions may be substantially opposed to one another.

The return force may have the effect that, during the non-operating state of the brake system or when the hydraulic braking moment is let down, hydraulic fluid flows from the at least one wheel brake and/or the master cylinder into the accumulator.

The hydraulic fluid reserve volume may be greater than 0.5 cm$^3$. For example, the hydraulic fluid reserve volume may lie in a range between 2 cm$^3$ and 0.5 cm$^3$. In a particular embodiment, the hydraulic fluid reserve volume may be 1 cm$^3$. The figures given above should be understood as examples; in concrete applications, the respective values may also differ from these.

Other advantages of this invention will become apparent to those skilled in the art from the following detailed description of the preferred embodiments, when read in light of the accompanying drawings.

DETAILED DESCRIPTION OF THE INVENTION

Embodiments of a hydraulic brake system of a land vehicle will be described below. Here, corresponding elements in the figures are designated by the same reference numerals.

Figure 1:
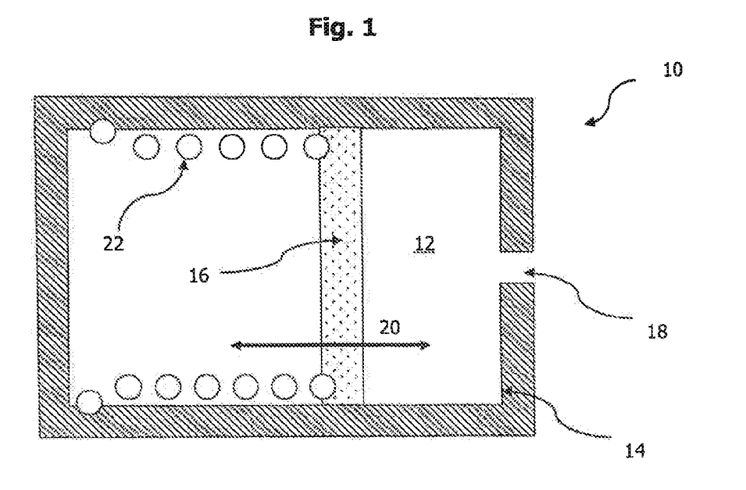
FIG. 1 shows a schematic sectional illustration of a first embodiment of an accumulator.

FIG. 1 shows a schematic cross section of a first embodiment of an accumulator 10. The accumulator 10 comprises a storage chamber 12. The storage chamber 12 is provided for the accommodation of hydraulic fluid of the brake system. The storage chamber 12 is delimited by the wall 14 and the piston 16. Provided in the wall 14 is an opening 18 which connects the storage chamber 12 of the accumulator 10 to hydraulic fluid lines of the brake system. The shape of the storage chamber 12 illustrated in FIG. 1 is substantially cylindrical. However, other shapes may also be provided for the accumulator 10 and the storage chamber 12. The piston 16 is displaceable, so it can be displaced along the wall 14. This is indicated by the double-headed arrow 20.

A first spring 22 supports the piston 16. The first spring 22 that is illustrated in FIG. 1 is secured to the piston 16 and the wall 14. For this purpose, one end of the first spring 22 is secured to the piston 16 and another end of the first spring 22 is secured to the wall 14. This is indicated in FIG. 1 by the fact that the outer windings of the first spring 22 project into the wall 14 and the piston 16. In the illustration of FIG. 1, the first spring 22 is arranged on the side of the piston 16 that is remote from the storage chamber 12. However, it is also possible for the first spring 22 to be arranged in the storage chamber 12. In the embodiment illustrated in FIG. 1, the piston 16 and the first spring 22 form a return element.

FIG. 1 illustrates a non-operating state. In the non-operating state, the piston 16 is in its rest position. Displacing the piston 16 to the left, that is to say displacing the piston 16 such that the volume of the storage chamber 12 is increased, puts the first spring 22 under an initial tension. Displacing the piston 16 to the right, that is to say displacing the piston 16 such that the volume of the storage chamber 12 is decreased, reduces the tension on the first spring 22. In the non-operating state shown in FIG. 1, the spring 22 is free of tension. The relaxed or tensioned first spring 22 exerts a return force on the piston 16. The return force has the effect that, after deflection as a result of taking up or giving up a volume, the piston 16 returns to its rest position.

When the piston 16 is in the rest position, there is a hydraulic fluid reserve volume $V_R$ in the storage chamber 12. The rest position of the piston 16 can be determined from the length of the first spring 22 and the hydraulic pressure prevailing in the accumulator 10 in the non-operating state of the brake system. The length of the first spring 22 may be selected such that the hydraulic fluid reserve volume $V_R$ is sufficient to generate a minimum brake pressure in at least one wheel brake. The minimum brake pressure, for its part, may be selected such that it has the effect that the land vehicle may be braked to a standstill and/or can be kept reliably at a standstill. As a result, the hydraulic fluid reserve volume $V_R$ may depend on the size of at least one wheel brake. The hydraulic fluid reserve volume $V_R$ may vary as a function of the number and size of the wheel brakes provided and may be for example at least 0.5 cm$^3$. In a particular embodiment, the hydraulic fluid reserve volume may be 1 cm$^3$. Further, the hydraulic fluid reserve volume may be for example 10-25% of the total accommodation volume of the accumulator 10. It will be seen that, in embodiments in which a plurality of accumulators 10 are provided, the numerical values for the individual accumulators 10 may differ. If for example in a brake circuit two mutually parallel partial accumulators are provided, the values will relate rather to the total accommodation volume of both partial accumulators, and the total of the hydraulic fluid reserve volume $V_R$ accommodated in both partial accumulators.

As a result of the return force of the return element, during the non-operating state of the brake system hydraulic fluid flows into the accumulator 10. If, for example after an operating state of the brake system, the accumulator 10 has been completely emptied, the return force has the effect that the piston 16 is displaced back into the rest position. This produces a negative pressure in the accumulator 10, by comparison with the pressure level in the rest of the brake system. As a result of the negative pressure in the accumulator 10, hydraulic fluid continues to flow into the accumulator 10 until equilibrium is re-established. Thus, the return element ensures that the hydraulic fluid reserve volume $V_R$ is already in the accumulator 10 the next time the brake system is actuated.

Figure 2:
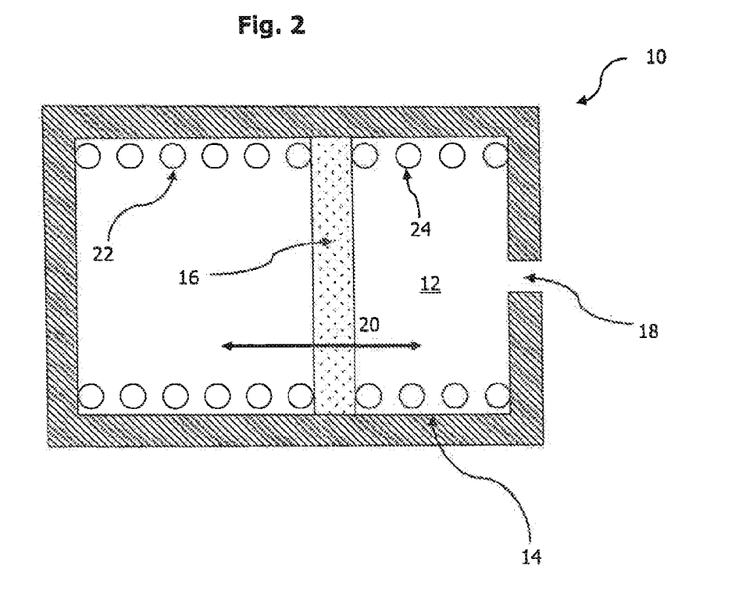
FIG. 2 shows a schematic sectional illustration of a second embodiment of an accumulator.

FIG. 2 illustrates a cross section of a second embodiment of an accumulator 10. The basic construction of the accumulator illustrated in FIG. 2 is similar to the accumulator illustrated in FIG. 1. However, the return elements of the accumulators 10 differ. The return element of the accumulator 10 illustrated in FIG. 2 comprises a piston 16, a first spring 22 and a second spring 24. The first and the second spring 22, 24 are arranged on opposite sides of the piston 16. In the illustration of FIG. 2, the second spring 24, for example, is arranged in the storage chamber 12 and the first spring 22 is arranged on the opposite side of the piston 16 to the storage chamber 12.

In the embodiment illustrated in FIG. 2, it is not necessary for the first spring 22 or the second spring 24 to be secured to the piston or the wall 14. Rather, the spring constant and/or the length of the first and the second spring 22, 24 can be adjusted to one another in order to obtain a desired rest position of the piston 16. In the non-operating state, the first and the second spring 22, 24 are approximately in equilibrium. However, the equilibrium of the first and the second spring 22, 24 is affected by the pressure of the hydraulic fluid accommodated in the storage chamber 12 in the non-operating state.

The accumulator 10 illustrated in FIG. 1 or 2 may for example be a low-pressure accumulator. The pressure of hydraulic fluid in the accumulator 10 may be for example approximately 2 bar. The spring characteristics of the first and the second spring 22, 24 may in this case be selected such that the pressure of the hydraulic fluid accommodated in the accumulator 10 rises only slightly when the accumulator 10 is filled.

Figure 3:
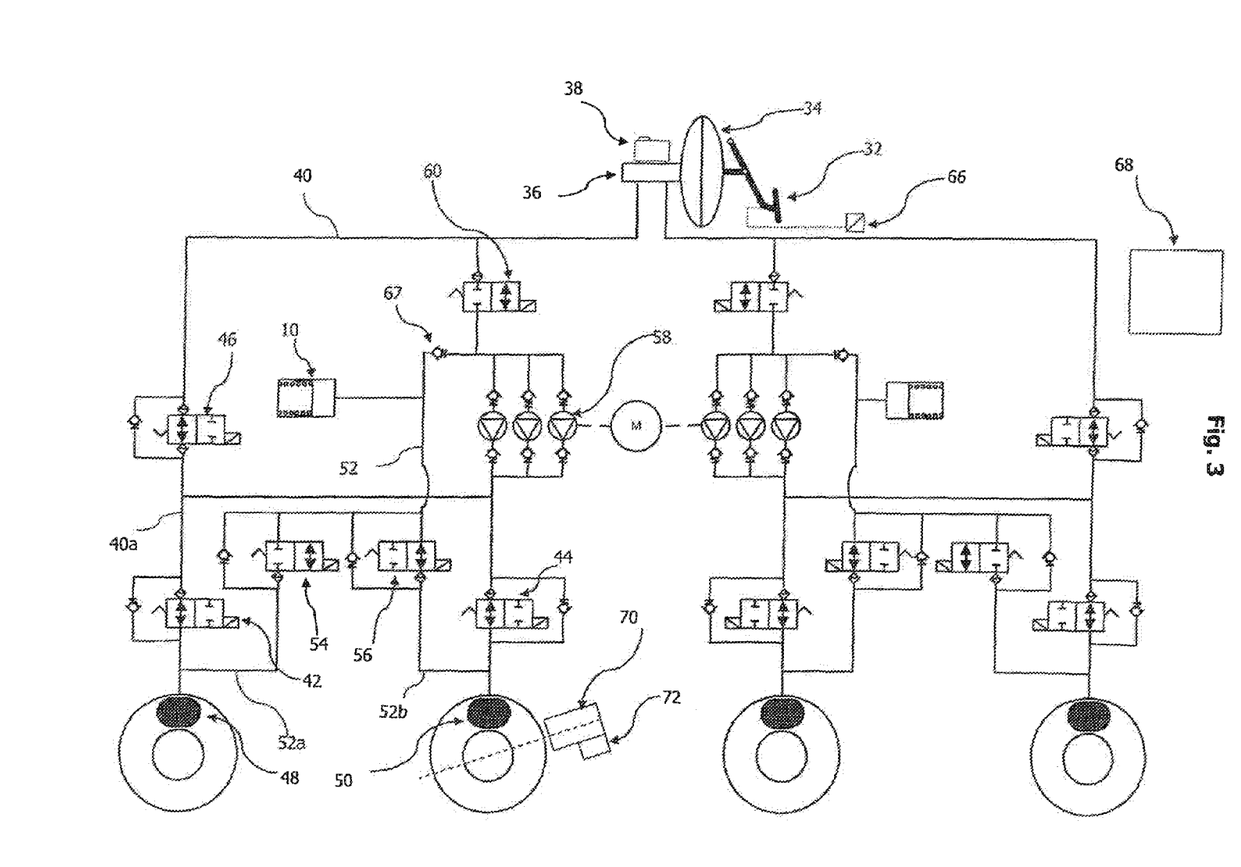
FIG. 3 shows a schematic hydraulic diagram of a brake system.

FIG. 3 is a schematic hydraulic diagram of a brake system 30. This hydraulic brake system 30 comprises the accumulator 10 described in connection with FIG. 1 or FIG. 2.

The brake system 30 enables regeneration, that is to say a deceleration procedure during which an electrical machine of the land vehicle converts the kinetic energy of the land vehicle into electrical energy. The brake system 30 has two hydraulically separated brake circuits, wherein the brake system is explained below with reference to one brake circuit. The statements made for the components of this brake circuit apply accordingly to the other brake circuit. Even where only one brake circuit is considered below, there are interactions between the two brake circuits. Thus, a pressure compensation is made by way of a master cylinder of the land vehicle, with the result that the same brake pressure typically prevails in both brake circuits.

The brake system 30 shown in FIG. 3 comprises a brake pedal 32. The brake pedal 32 is connected to a master cylinder 36 by way of a brake force amplifier 34. The master cylinder 36 is connected to a brake fluid container 38 in which hydraulic fluid is kept in reserve.

The master cylinder 36 is connected to a first wheel brake 48 and a second wheel brake 50 by way of supply lines 40, 40a, 40b. A first isolation valve 42 is provided in the supply line 40a to the first wheel brake 48, wherein the first isolation valve 42 is adapted to selectively block the supply line 40a to the first wheel brake. Provided in the supply line 40b to the second wheel brake 50 there is a second isolation valve 44, wherein the second isolation valve 44 is adapted to selectively block the supply line 40b to the second wheel brake 50. Between the master cylinder 36 and the wheel brakes there is arranged, in the supply line 40, a third isolation valve 46 which is adapted to block the supply line 40. In this way, the third isolation valve 46 isolates the master cylinder 36 from the wheel brakes 48, 50 in the closed state of the switch.

Return lines 52, 52a, 52b lead from the first and the second wheel brake 48, 50 to an input of a pump 58. Arranged in the return line 52a from the first wheel brake 48 is a first pressure let-down valve 54, wherein the first pressure let-down valve 54 is adapted to selectively block the return line 52a from the first wheel brake 48. Arranged in the return line 52b from the second wheel brake 50 is a second pressure let-down valve 56, wherein the second pressure let-down valve 56 is adapted to selectively block the return line 52b from the second wheel brake 50.

The accumulator 10 is connected to the return line 52 and is adapted to temporarily accommodate hydraulic fluid that flows out of the wheel brakes 48, 50. Provided in the return line 52 between the accumulator 10 and the input of the pump 58 is a shut-off valve 67. Further shut-off valves that serve to limit pressure are provided parallel to the isolation valves 42, 44, 46 and the pressure let-down valves 54, 56 in order to short across them when the pressure prevailing on one side of the shut-off valves exceeds a predetermined value.

The pump 58 is adapted to convey hydraulic fluid to the wheel brakes 48, 50. For this purpose, the output of the pump 58 is connected to the supply line 40. The input of the pump 58 is connected to a supply valve 60 such that the input of the pump 58 is connectable to the brake fluid container 38 by way of the supply valve 60. Opening the supply valve 60 enables the pump 58 to draw hydraulic fluid out of the brake fluid container 38. The pump 58 may be a radial piston pump whereof the conveying power is variable, wherein the pump illustrated in FIG. 3 is a radial piston pump having six pistons.

The isolation valves 42, 44, 46 and the pressure let-down valves 54, 56 and the supply valve 50 may be for example electromagnetically actuable 2/2-way valves. The isolation valves 42, 44, 46 are valve arrangements open in the normal position, which in the normal position (with no current applied) allow hydraulic fluid to flow through. The pressure let-down valves 54, 56 and the supply valve 60 are valve arrangements closed in the normal position, which in the normal position (with no current applied) prevent hydraulic fluid from flowing through. However, it is also possible to use other valves to achieve the same effect.

The isolation valves 42, 44, 46 and the pressure let-down valves 54, 56 may be adapted to be driven completely or partially. In the case of partial driving of the valves, the drive energy is not sufficient to open or close them completely. The valves are thus in a partially opened switching state, in which a smaller volume of hydraulic fluid can flow away by way of the valves than in the completely opened switching state. In this way, the valves throttle the flow of hydraulic fluid in the partially opened switching state.

Moreover, FIG. 3 illustrates a control unit 68. The control unit 68 is electrically conductively connected to the pressure let-down valves 54, 56 and to the supply valve 60 by means of the isolation valves 42, 44, 46, and is adapted to predetermine switching states for these valves. This driving of the valves may also be called opening and closing of the valves. The control unit 68 is also electrically conductively connected to a motor of the pump 58 and is adapted to predetermine the conveying output of the pump 58. Thus, for example, the control unit 68 may output a pulse width modulation signal (PWM signal) and hence predetermine the speed of rotation of the pump 58. For reasons of clarity, the respective electrical connections are not illustrated.

Further, a pedal travel sensor 66 for detecting actuation of the brake pedal 32 is arranged on the brake pedal 32, wherein the pedal travel sensor 66 emits to the control unit 68 a signal that corresponds to actuation of the brake pedal 32. The brake system may include further components, such as sensors, wherein these are not absolutely necessary for understanding of the present brake system and are not illustrated here, for reasons of clarity.

FIG. 3 indicates an electrical machine 70. The electrical machine 70 is adapted to convert kinetic energy of the land vehicle into electrical energy during a deceleration procedure. Here, the electrical machine 70 generates a generative braking moment. The electrical machine 70 may be part of the drive train of the land vehicle. It is equally possible for the electrical machine 70 to be a generator which is coupled to the wheels of the land vehicle independently of the drive train and is provided specifically for the conversion of kinetic energy into electrical energy. Operation of the electrical machine 70 is controlled by a control device 72. The control device 72 is connected to the control unit 68 of the brake system. Accordingly, data and/or control signals may be exchanged between the control device 72 of the electrical machine and the control unit 68 of the brake system. In addition to two separate controls for the brake system 30 and the electrical machine 70, a a common control may also be provided.

The non-operating state and the operating state of the brake system 30 will be explained below with reference to FIG. 3. In the non-operating state of the brake system 30, that is to say in a state in which no hydraulic braking moment is applied, the first, second and third isolation valves 42, 44, 46 and the first and/or second pressure let-down valve 54, 56 are opened. During the non-operating state, the hydraulic fluid is not under pressure. As a result of the return force of the return element, hydraulic fluid continues to flow out of the brake fluid container 38 or the wheel brakes 48, 50 and into the accumulator 10 until the piston 16 is in its rest position and the accumulator 10 takes up the hydraulic fluid reserve volume $V_R$.

In an actuating state of the brake system 30, that is to say in a state in which at least one wheel the land vehicle is decelerated or is to be decelerated by means of the brake system 30, the hydraulic fluid reserve volume $V_R$ may be drawn by the pump 38 and conveyed into the wheel brakes 48, 50. As a result, brake pressure may be built up in the wheel brakes 48, 50, quickly and effectively; even in the case of braking procedures in which no hydraulic fluid has been displaced from the master cylinder 36 to the wheel brakes 48, 50 and from there to the accumulator 10. Braking procedures of this kind may for example be provided if the land vehicle—for example during travel at crawling speed or in a traffic jam—has only been braked by the electrical machine 70 (with no regenerative braking procedure) and the hydraulic braking moment is to be let down in order to keep the land vehicle reliably at a standstill, or if a hydraulic braking moment is to be built up during a regenerative braking procedure in order to perform traction control.

The hydraulic fluid reserve volume $V_R$ that is provided may also be used if, during an actuating state of the brake system 30 that is initiated by the driver, the volume displacement from the master cylinder 36 to the wheel brakes 48, 50 has been throttled. For throttling of this volume displacement, the control unit 68 may partially drive one or more of the isolation valves 42, 44, 46 so that the driven isolation valve is partially closed. Throttling the volume displacement has the effect that less hydraulic fluid is displaced to the wheel brakes 48, 50 than would be required to build up a minimum brake pressure. During regeneration, although the missing hydraulic fluid volume may be compensated by the generative braking movement, during the end phase of regeneration the generative braking moment falls off. This falling off is then compensated by building up hydraulic braking moment. In so doing, the hydraulic fluid reserve volume $V_R$ may be partially or completely conveyed to the wheel brakes 48, 50 in order to build up the desired hydraulic braking moment there.

This particular operating state will be discussed in more detail below. During regeneration, some of the total braking moment is provided by the brake system 30 and the rest by the electrical machine 70. So that the course of the braking procedure remains predictable to the driver and no unexpected effects occur, the total braking moment comprising the hydraulic braking moment and the generative braking moment should correspond, throughout the braking procedure, to the amount of braking desired by the driver and provided by actuating the brake pedal 32. Replacing the hydraulic braking moment by a generative braking moment and vice versa may in this context be called switch-over.

In the brake system 30 that is illustrated in FIG. 3, the isolation valves 42, 44, 46 are opened in the starting phase of regeneration. As a result, actuation of the brake pedal 32 by the driver brings about a volume displacement of the hydraulic fluid from the master cylinder 36 to the wheel brakes 48, 50. Accordingly, by actuating the brake pedal 32 the driver builds up a braking pressure and hence a hydraulic braking moment in the wheel brakes 48, 50.

During the build-up of hydraulic braking moment by the driver, at least one of the isolation valves 42, 44, 46 may be partially driven. For example, the first and the second isolation valve 42, 44 or the third isolation valve 46 may be driven. Partially driving one of the isolation valves 42, 44, 46 has the effect that volume displacement from the master cylinder 36 to the wheel brakes 48, 50 is throttled. Throttling the volume displacement delays the build-up of pressure in the wheel brakes 48, 50. Moreover, the brake pressure prevailing in the wheel brakes 48, 50 is smaller than the brake pressure prevailing in the master cylinder 36. Thus, the hydraulic braking moment can be built up to a reduced extent even during build-up of the total braking moment.

During this, the control unit 68 may provided the throttling action of the isolation valve or valves 42, 44, 46 such that the pedal reaction as a result of the throttling action corresponds as far as possible to the pedal reaction during a purely hydraulic braking procedure. For example, the isolation valve or valves 42, 44, 46 may be driven such that increasing deflection of the brake pedal 12 results in increasing closure of the isolation valve or valves 42, 44, 46.

Because of the resistance caused by the throttling action, a suitable countering force may be produced at the brake pedal. Thus, the driver does not have the feeling that he or she is about to push the brake pedal 32 right to the floor. Because less hydraulic fluid is displaced to the wheel brakes, as a result of the throttling action, the extension to the pedal travel that otherwise frequently occurs with regeneration can be at least reduced. The pedal reaction of the brake system constructed in this manner thus substantially corresponds to the pedal reaction of conventional brake systems, or is at least largely approximated thereto. For this reason, a particular pedal reaction simulation device can be dispensed with. Moreover, the partial closure of the isolation valves 42, 44 is performed to a very great extent without creating noise.

The pressure let-down valves 54, 56 may be opened or closed by the driver during the build-up of braking moment, depending on how the transition from hydraulic braking moment to generative braking moment is implemented. For example, the regulation of accumulated pressure described in DE 10 2012 023 345.0 may be provided to reduce the hydraulic braking moment as a function of the generative braking moment that is built up by the electrical machine 70. The disclosure of DE 10 2012 023 345.0 is hereby incorporated by reference in its entirety.

As soon as the generative braking moment has been built up by the electrical machine 70, it is typically possible to switch over entirely from the hydraulic braking moment. For this purpose, a first hydraulic fluid volume $V_B$ that is received in the wheel brakes 48, 50 flows through the opened pressure let-down valves 54, 56 and into the accumulator 10. As a result of taking up the first hydraulic fluid volume $V_B$, the return element in the accumulator 10 is put under tension. For example, the piston 16 illustrated in FIG. 1 is displaced to the left and hence the first spring 22 is put under tension.

In order to brake the land vehicle to a standstill, a hydraulic braking moment is frequently built up again at the end of regeneration. For this purpose, the control unit 68 may drive the pump 58 such that the pump 58 conveys hydraulic fluid from the accumulator 10 to the wheel brakes 48, 50. If the first hydraulic fluid volume $V_B$ taken up from the wheel brakes 48, 50 is insufficient to build up the minimum brake pressure mentioned above in the wheel brakes 48, 50, the pump 58 may additionally take the hydraulic fluid reserve volume $V_R$ from the accumulator 10 and convey it to the wheel brakes 48, 50. As a result, the piston 16 illustrated in FIG. 1 is displaced to the right and the first spring 22 is relaxed.

Thus, for building up the hydraulic braking moment in the wheel brakes 48, 50, it is possible to use not only the first hydraulic fluid volume $V_B$ but also the hydraulic fluid reserve volume $V_R$. Because the hydraulic fluid reserve volume $V_R$ may be of a dimension such that it is sufficient by itself to produce a minimum braking pressure in the wheel brakes, the hydraulic braking moment may be built up independently of the first hydraulic fluid volume $V_B$. It is thus unimportant how much hydraulic fluid was displaced to the wheel brakes 48, 50 from the master cylinder 36 during the build-up of braking moment. Rather, the provision of the hydraulic fluid reserve volume $V_R$ can decouple the build-up of hydraulic braking pressure in the end phase of the braking procedure from the build-up of hydraulic braking pressure in a starting phase of the braking procedure. For this reason, it is not necessary, even in the case of braking procedures in which no or little hydraulic fluid is displaced to the wheel brakes, for the control unit 68 to open for example the supply valve 60 in the end phase of regeneration and for the pump 58 to draw hydraulic fluid from the brake fluid container 38. In this way, the hydraulic fluid reserve volume $V_R$ that is provided may produce sufficient hydraulic braking moment without the need for valve switching procedures to achieve this.

As a result of throttling the volume displacement, the driver may be provided with a countering force at the brake pedal, and the extension in the pedal travel may be reduced. By thus to displace the graph of pedal travel:pedal force as a result of the regeneration to only a small extent, however, a conventional pedal feel may be imparted to the driver. Since less hydraulic fluid is displaced to the wheel brakes 48, 50 even during build-up of the braking moment, a larger proportion of the total braking moment may be taken over by the generative braking moment, with the result that the regeneration performance may be increased. Moreover, as a result of the particular construction of the accumulator 10, the residual pressure prevailing in the brake system during regeneration may be reduced. Because the accumulator 10 already takes up the hydraulic fluid reserve volume $V_R$ in the non-operating state, the residual pressure only rises to the extent required to take up the first hydraulic fluid volume $V_B$. Accordingly, the spring has to be put under less tension.

Figure 4:
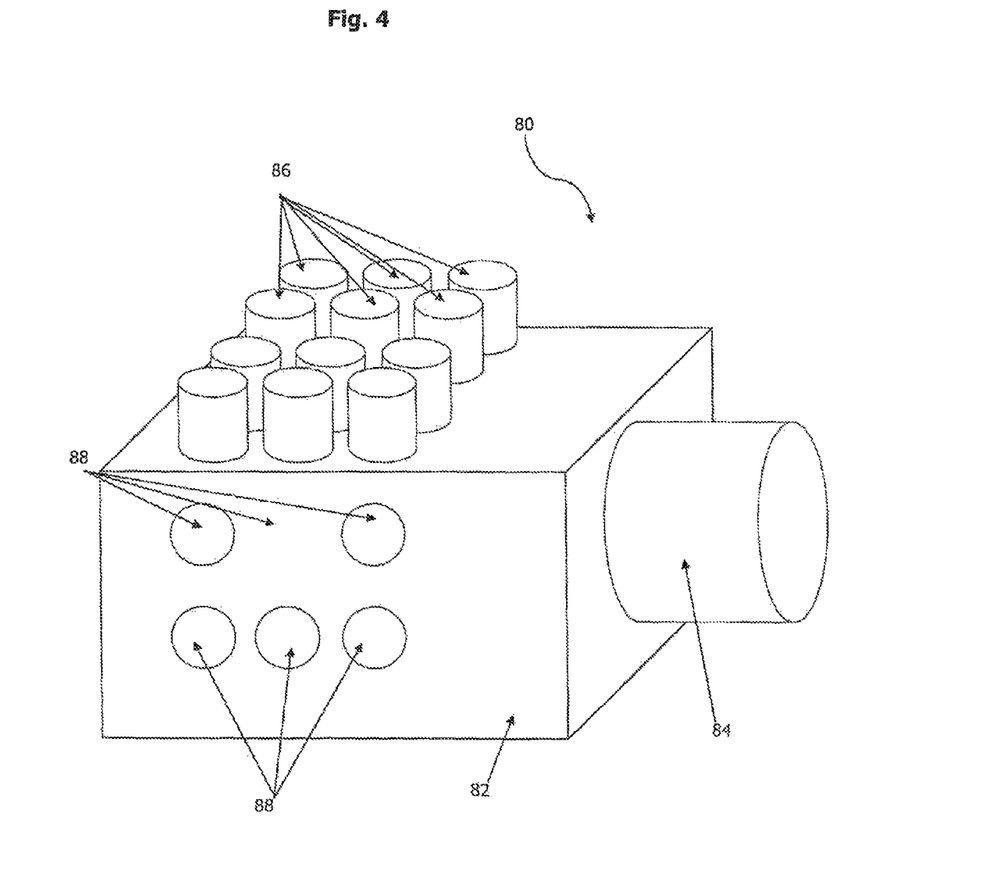
FIG. 4 shows a schematic view of a hydraulic unit.

FIG. 4 is a schematic illustration of a hydraulic unit 80. The hydraulic unit 80 includes a metal body 82 which may be made for example from aluminium. The interior of the metal body 82 accommodates at least the pistons of the pump 58, the isolation valves 42, 44, 46 and pressure let-down valves 54, 56. In FIG. 4, only the motor 84 of the pump 58 and the coil bodies 86 for actuating the valves are visible. In addition, further elements of the brake circuit that is described in connection with FIG. 3 may be accommodated in the hydraulic unit 80. These are located in the interior of the metal body, however, and so are not visible.

The hydraulic unit 80 illustrated in FIG. 4 further includes hydraulic connections 88 to which the wheel brakes 48, 50 and the master cylinder 36 may be connected. Moreover, one or more accumulators 10 may be provided in or on the hydraulic unit 80. Accumulators 10 that are accommodated in the hydraulic unit 80 may take the form of a bore in the metal body 82. The bore accommodates the piston 16 and the first and where appropriate also the second spring 22, 24. The bore may be closed off, wherein one of the springs 22, 24 may be supported against the closure element of the bore. As an alternative, it is also possible for connections 88 for one or more accumulators 10 to be provided on the hydraulic unit 80. Finally, the control unit 68 may also be mounted on the hydraulic unit 80.

The variants on the brake system 30 and the accumulator 10 that are described above serve merely for better understanding of the structure, mode of operation and properties of the brake system 30 and the accumulator 10; they do not restrict the disclosure, for example to the embodiments. The figures are partly schematic, with essential properties and effects being in some cases illustrated on a clearly larger scale in order to make clear the operations, principles of action, technical constructions and features. In this case, every mode of operation, principle, technical construction and feature which is or are disclosed in the figures or text may be combined freely and as desired with all the claims, any feature in the text and the other figures, other modes of operation, principles, technical constructions and features which are contained in this disclosure or become apparent therefrom, with the result that all conceivable combinations can be ascribed to the described brake system 30 and accumulator 10. This also includes combinations of all the individual statements in the text, that is to say in every section of the description, the claims and indeed combinations of different variants in the text, the claims and the figures.

Nor do the claims limit the disclosure and hence the possible combinations of all the mentioned features with one another. All the features disclosed are explicitly disclosed here both individually and in combination with all the other features.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

The invention claimed is:

1. Hydraulic brake system for a land vehicle, comprising
at least one wheel brake, which is assigned to a wheel of the land vehicle;
a master cylinder, which is hydraulically connected to the at least one wheel brake, wherein the master cylinder is adapted to displace hydraulic fluid into the at least one wheel brake when the brake system is actuated by a driver;
a pump, the output of which is hydraulically connected to the at least one wheel brake, and the pump is adapted to displace hydraulic fluid into the at least one wheel brake;
at least one valve arrangement;
a control unit which is adapted to drive the pump and the at least one valve arrangement and, during an actuating state, to drive a first valve arrangement of the at least one valve arrangement, arranged between the at least one wheel brake and the master cylinder, such that the first valve arrangement throttles a volume displacement from the master cylinder to the at least one wheel brake; and
an accumulator, which is hydraulically connected to the at least one wheel brake and to an input of the pump, wherein the accumulator includes a return element and is adapted to
accommodate a hydraulic fluid reserve volume during a non-operating state of the brake system, and
provide the accommodated hydraulic fluid reserve volume to the pump for displacing it to the at least one wheel brake during an operating state of the brake system;
wherein the control unit is further adapted to
predetermine switching states for the at least one valve arrangement during a first phase of the actuating state, wherein the predetermined switching states of the at least one valve arrangement have the effect that a first hydraulic fluid volume is displaced from the at least one wheel brake to the accumulator; and
predetermine switching states for the at least one valve arrangement and a drive signal for the pump during a second phase of the actuating state, wherein the drive signal and the switching states have the effect of displacing a second hydraulic fluid volume from the accumulator to the at least one wheel brake, wherein the second hydraulic fluid volume comprises at least part of the hydraulic fluid reserve volume;
wherein the first phase is a starting phase of regeneration and the second phase is an end phase of regeneration, and during regeneration an electrical machine of the land vehicle converts kinetic energy of the land vehicle into electrical energy.

2. Hydraulic brake system according to claim 1, wherein the second hydraulic fluid volume is greater than the first hydraulic fluid volume.

3. Hydraulic brake system according to claim 1, wherein the control unit is adapted to predetermine switching states for the at least one valve arrangement during the first phase of the actuating state, wherein a pedal reaction, which corresponds to a pedal reaction in the case of a purely hydraulic braking procedure, is provided to the driver by way of the brake pedal.

4. Hydraulic brake system according to claim 1, wherein a restoring element comprises a piston, which delimits the accumulator, and a first spring acting on the piston.

5. Hydraulic brake system according to claim 4, wherein the first spring is arranged such that the first spring exerts a restoring force which counters deflection of the piston in a first direction and deflection of the piston in a second direction.

6. Hydraulic brake system according to claim 4, wherein the restoring element further comprises a second spring, and wherein the first and the second spring are arranged such that the first spring brings about a restoring force in a first direction and the second spring brings about a restoring force in a second direction.

7. Hydraulic brake system according to claim 1, wherein the hydraulic fluid reserve volume is greater than 0.5 $cm^3$.

8. Hydraulic unit for a brake system defined in claim 1, wherein the pump, the at least one valve arrangement and the accumulator are assigned to the hydraulic unit.

9. Accumulator according to claim 1, which is hydraulically connected to the at least one wheel brake and an input of the pump, wherein the accumulator includes a restoring element and is adapted to take up a hydraulic fluid volume from at least one of the wheel brakes.

10. Hydraulic brake system according to claim 1, wherein the hydraulic fluid reserve volume is greater than 1 $cm^3$.

* * * * *